US011522981B2

(12) United States Patent
Rodrigues et al.

(10) Patent No.: US 11,522,981 B2
(45) Date of Patent: Dec. 6, 2022

(54) SYSTEMS AND METHODS FOR MANAGING DEVICES USING DYNAMICALLY CONFIGURABLE DEVICE AND PROTOCOLS DEFINITIONS

(71) Applicant: SOTI INC., Mississauga (CA)

(72) Inventors: Carl Rodrigues, Mississauga (CA); Vadim Fux, Waterloo (CA); Hany Kashif, Mississauga (CA); Chadi Elkadri, Waterloo (CA); Sheldon Davis, Mississauga (CA); Joseph Gordon, Cambridge (CA)

(73) Assignee: SOTI INC., Mississauga (CA)

( * ) Notice: Subject to any disclaimer, the term of this patent is extended or adjusted under 35 U.S.C. 154(b) by 0 days.

(21) Appl. No.: 17/496,138

(22) Filed: Oct. 7, 2021

(65) Prior Publication Data

US 2022/0030096 A1    Jan. 27, 2022

Related U.S. Application Data

(63) Continuation of application No. 17/061,900, filed on Oct. 2, 2020, now Pat. No. 11,172,057.

(60) Provisional application No. 62/910,956, filed on Oct. 4, 2019.

(51) Int. Cl.
| | | |
|---|---|---|
| G06F 15/16 | (2006.01) |
| H04L 69/329 | (2022.01) |
| H04L 67/00 | (2022.01) |
| H04L 41/12 | (2022.01) |
| H04L 69/00 | (2022.01) |

(52) U.S. Cl.
CPC ............ H04L 69/329 (2013.01); H04L 41/12 (2013.01); H04L 67/34 (2013.01); H04L 69/03 (2013.01)

(58) Field of Classification Search
None
See application file for complete search history.

(56) References Cited

U.S. PATENT DOCUMENTS

| | | | |
|---|---|---|---|
| 6,606,660 B1 | 8/2003 | Bowman-Amuah | |
| 6,738,975 B1 | 5/2004 | Yee | |
| 10,693,711 B1* | 6/2020 | Garg | ........................ H04L 41/12 |
| 10,715,570 B1* | 7/2020 | Feinstein | ................ H04L 69/08 |
| 10,805,171 B1* | 10/2020 | Anwer | ................ H04L 41/5019 |

(Continued)

*Primary Examiner* — Phyllis A Book
(74) *Attorney, Agent, or Firm* — Norton Rose Fulbright Canada LLP

(57) ABSTRACT

Disclosed are systems, methods, and devices for managing a plurality of remote devices of disparate types. There is maintained an electronic device definition repository comprising: a plurality of semantic model definitions for corresponding devices of the plurality of remote devices. An action request for an action to be performed by one or more selected devices of the plurality of remote devices is received. For each one or more selected devices, the action request is processed including: converting a generic device action and a generic device property to a device-specific action and a device-specific property using the semantic model definition for the selected device; establishing one or more messages for communicating the device-specific action request to a given selected device using the data protocol definition for the selected device; translating the one or more messages of the sequence of messages to an application protocol suitable for communication with the selected device.

20 Claims, 17 Drawing Sheets

(56) References Cited

U.S. PATENT DOCUMENTS

| | | | |
|---|---|---|---|
| 2003/0172368 A1 | 9/2003 | Alumbaugh | |
| 2005/0267935 A1* | 12/2005 | Gandhi | H04L 67/125 |
| | | | 709/203 |
| 2006/0010195 A1 | 1/2006 | Mamou | |
| 2010/0161821 A1 | 6/2010 | Slamkovic | |
| 2012/0137307 A1* | 5/2012 | Sarferaz | G06Q 10/10 |
| | | | 719/317 |
| 2014/0201321 A1* | 7/2014 | Donaghey | H04L 69/08 |
| | | | 709/217 |
| 2014/0297803 A1* | 10/2014 | DelloStritto | G16H 10/60 |
| | | | 709/218 |
| 2016/0028780 A1* | 1/2016 | Verzano | H04L 67/02 |
| | | | 709/204 |
| 2018/0367402 A1* | 12/2018 | Harneja | H04L 41/0893 |
| 2018/0367403 A1* | 12/2018 | Harneja | H04L 41/145 |
| 2018/0367404 A1* | 12/2018 | Harneja | H04L 41/0895 |
| 2019/0268178 A1 | 8/2019 | Fairweather | |
| 2019/0280889 A1* | 9/2019 | Malakuti | H04L 69/08 |
| 2021/0083942 A1* | 3/2021 | Finkelstein | H04L 41/0896 |

\* cited by examiner

```xml
<?xml version="1.0" encoding="UTF-8"?>
<Domain id="device-model1-printer"
xsi:schemaLocation="http://www.soti.net/connect-
definitions ../../../Soti.IoT.SemanticEngine/Soti.IoT.SemanticEngine.Parser/Schema/
xmlns:xsi="http://www.w3.org/2001/XMLSchema-instance"
xmlns:xi="http://www.w3.org/2001/XInclude"
xmlns="http://www.soti.net/connect-definitions">
    <Imports>
        <xi:include parse="xml" href="./printers.xml"/>
    </Imports>
    <Modules>
        <!--general-->
        <ModuleClass id="Devmodel1PrinterGeneral">
            <Actions>
                <Action id="delete" name="Delete From Device model1"/>
                <Action id="install-update-url" name="Install Package From Url">
                    <Args>
                        <Arg name="Download Url">
                            <DataType name="value">
                                <SimpleType type="url"/>
                            </DataType>
                        </Arg>
                    </Args>
                </Action>
                <Action id="install-update-filestore" name="Install Package From File
                Store">
                <Action id="change-general" name="Change General Settings">
                <Action id="change-general_network" name="Change General
                Network Settings">
            </Actions>
            <Data>
                <DataPoint id="ipv6_usage" name="IPv6 Usage" writable="true"
                readable="true">
                    <DataType name="value">
                        <SimpleType type="boolean"/>
                    </DataType>
                </DataPoint>
                <DataPoint id="priority_on_ipv6_address" name="Priority on IPv6
                address" writable="true" readable="true">
                    <DataType name="value">
                        <SimpleType type="boolean"/>
                    </DataType>
                </DataPoint>
                <DataPoint id="current_status" name="Device Status" readable="true">
                    <DataType name="value">
                        <SimpleType type="string"/>
                    </DataType>
                </DataPoint>
```

FIG. 4A

```xml
<ModuleClass id="Devmodel1PrinterAlert">
    <Events>
        <Event id="CRITICAL" name="Critical"/>
        <Event id="ERROR" name="Error"/>
        <Event id="ALERT" name="Alert"/>
    </Events>
    <Data>
        <DataPoint id="critical-event_id" name="Critical Event ID"
            readable="true">
            <DataType>
                <SimpleType type="string"/>
            </DataType>
        </DataPoint>
        <DataPoint id="critical-event_description" name="Critical Event
            Description" readable="true">
            <DataType>
                <SimpleType type="string"/>
            </DataType>
        </DataPoint>
        <DataPoint id="critical-event_type" name="Critical Event Type"
            readable="true">
            <DataType>
                <SimpleType type="string"/>
            </DataType>
        </DataPoint>
        <DataPoint id="critical-timestamp" name="Critical Event Timestamp"
            readable="true">
            <DataType>
                <SimpleType type="datetime"/>
            </DataType>
        </DataPoint>
        <DataPoint id="error-event_id" name="Error Event ID" readable="true">
            <DataType>
                <SimpleType type="string">
                    <Constraint>
                        <Enumeration>
                            <Value>ApplySettingFailed</Value>
                            <Value>BufferFullError</Value>
                            <Value>CheckStatusFailed</Value>
                            <Value>CommunicationError</Value>
                            <Value>FactoryResetFailed</Value>
                            <Value>InstallFileFailed</Value>
                            <Value>PrintTestPageFailed</Value>
                            <Value>RebootFailed</Value>
                            <Value>ShutdownFailed</Value>
                        </Enumeration>
                    </Constraint>
```

FIG. 4B

```xml
- <Conversions>
    - <PropertyConversions>
        - <PropertyConversionSpecificToInherited
          function="Devmodel1DarknessToPercent"
          toDataPointId="PrintQuality#darkness" toDeviceId="thermal-
          printer" toDeviceDomainId="printers">
            <fromDataPointId>Devmodel1PrinterGeneralExtended#print_density</fromDataPointId>
          </PropertyConversionSpecificToInherited>
        - <PropertyConversionSpecificToInherited function="InchToMm"
          toDataPointId="PrintQuality#printing-speed" toDeviceId="thermal-
          printer" toDeviceDomainId="printers">
            <fromDataPointId>Devmodel1SystemSettings-
            RJ4200#print_speed</fromDataPointId>
          </PropertyConversionSpecificToInherited>
      </PropertyConversions>
    - <ActionConversions>
        - <ActionConversionInheritedToSpecific
          toActionId="Devmodel1SystemSettings-RJ4200#change-
          printing_quality" fromActionId="PrintQuality#change-print-quolity"
          fromDeviceId="thermal-printer" fromDeviceDomainId="printers">
            - <ArgConversion function="PercentToDevmodel1Darkness"
              outArgName="Print Density">
                <inputArgName>Darkness</inputArgName>
              </ArgConversion>
            - <ArgConversion function="MmToInch" outArgName="Print
              Speed">
                <inputArgName>Print Speed</inputArgName>
              </ArgConversion>
          </ActionConversionInheritedToSpecific>
      </ActionConversions>
  </Conversions>
```

FIG. 4C

```xml
<?xml version="1.0" encoding="UTF-8"?>
<Domain id="printers" xsi:schemaLocation="http://www.soti.net/connect-
definitions ../../../Soti.IoT.SemanticEngine/Soti.IoT.SemanticEngine.Parser/Schema/
xmlns:xsi="http://www.w3.org/2001/XMLSchema-instance"
xmlns:xi="http://www.w3.org/2001/XInclude"
xmlns="http://www.soti.net/connect-definitions">
    <Imports>
        <xi:include parse="xml" href="./device.xml"/>
        <xi:include parse="xml" href="./network-info.xml"/>
    </Imports>
    <Modules>
        <ModuleClass id="GenericPrinterState">
            <Actions>
                <Action id="print-test-page" name="Print Test Page"/>
                <Action id="reboot" name="Reboot"> </Action>
                <Action id="factory-reset" name="Factory Reset"> </Action>
            </Actions>
            <Data>
                <DataPoint id="serial-number" name="Serial Number" readable="true">
                    <DataType name="value">
                        <SimpleType type="string"/>
                    </DataType>
                </DataPoint>
            </Data>
        </ModuleClass>
        <ModuleClass id="MemoryInfo">
            <Data>
                <DataPoint id="available-memory" name="Available Memory"
                readable="true">
                    <DataType name="value" unitOfMeasure="MB">
                        <SimpleType type="integer"/>
                    </DataType>
                </DataPoint>
                <DataPoint id="available-storage" name="Available Storage"
                readable="true">
                    <DataType name="value" unitOfMeasure="MB">
                        <SimpleType type="integer"/>
                    </DataType>
                </DataPoint>
                <DataPoint id="total-memory" name="Total Memory" readable="true">
                    <DataType name="value" unitOfMeasure="MB">
                        <SimpleType type="integer"/>
                    </DataType>
                </DataPoint>
                <DataPoint id="total-storage" name="Total Storage" readable="true">
                    <DataType name="value" unitOfMeasure="MB">
                        <SimpleType type="integer"/>
                    </DataType>
```

FIG. 5

```xml
<?xml version="1.0" encoding="UTF-8"?>
<Domain id="device" xsi:schemaLocation="http://www.soti.net/connect-definitions ../../../Soti.IoT.SemanticEngine/Soti.IoT.SemanticEngine.Parser/Schema/semantic..
  xmlns:xsi="http://www.w3.org/2001/XMLSchema-instance"
  xmlns:xi="http://www.w3.org/2001/XInclude" xmlns="http://www.soti.net/connect-definitions">
  <Devices>
    <Device id="base-device" name="Base Device">
      <Modules>
        <Module id="base-module">
          <Data>
            <DataPoint id="model-id" name="Model" readable="true">
              <DataType name="value">
                <SimpleType type="string"/>
              </DataType>
            </DataPoint>
            <DataPoint id="device-name" name="Device Label" readable="true">
              <DataType name="value">
                <SimpleType type="string"/>
              </DataType>
            </DataPoint>
            <DataPoint id="device-id" name="API Device ID" readable="true">
              <DataType name="value">
                <SimpleType type="string"/>
              </DataType>
            </DataPoint>
            <DataPoint id="manufacturer" name="Manufacturer" readable="true">
              <DataType name="value">
                <SimpleType type="string"/>
              </DataType>
            </DataPoint>
            <DataPoint id="version" name="Version" readable="true">
              <DataType name="value">
                <SimpleType type="string"/>
              </DataType>
            </DataPoint>
          </Data>
          <Actions>
            <Action id="checkin" name="Check In"/>
          </Actions>
        </Module>
      </Modules>
    </Device>
  </Devices>
</Domain>
```

FIG. 6

```xml
<?xml version="1.0" encoding="UTF-8"?>
<Domain xsi:schemaLocation="http://www.soti.net/connect-
definitions ../../../Soti.IoT.ProtocolDefinitions/Soti.IoT.ProtocolDefinitions.Parser/protocol.
xmlns:xsi="http://www.w3.org/2001/XMLSchema-instance"
xmlns:xi="http://www.w3.org/2001/XInclude" xmlns="http://www.soti.net/connect-
definitions">
    <Imports>
        <xi:include parse="xml" href="./base-rest-protocol.xml"/>
    </Imports>
    <Messages>
        <Message id="FactoryReset"> </Message>
        <Message id="Reboot"> </Message>
        <Message id="Shutdown"> </Message>
        <Message id="GetPrinterState_rj2000"/>
        <Message id="GetPrinterState_rj2000_jpn"/>
        <Message id="GetPrinterState_rj3000_td2000"/>
        <Message id="GetPrinterState_rj4200"/>
        <Message id="GetPrinterState_rj4200_jpn"/>
        <Message id="GetPrinterState_td4000_200dpi"/>
        <Message id="GetPrinterState_td4000_jpn_200dpi"/>
        <Message id="GetPrinterState_td4000_300dpi"/>
        <Message id="GetPrinterState_td4000_jpn_300dpi"/>
        <Message id="PrintTestPage"> </Message>
        <Message id="DeleteFromServer"> </Message>
        <Message id="InstallFromUrl">
            <Object id="Resource">
                <Segment id="url" type="uri"/>
            </Object>
        </Message>
        <Message id="InstallFromFileStore">
            <Object id="Resource">
                <Segment id="file" type="filestore"/>
            </Object>
        </Message>
        <Message id="CRITICAL">
            <Object id="Resource">
                <DataPointReference id="event_id" path="Devmodel1PrinterAlert#critical-
                    event_id"/>
                <DataPointReference id="event_description"
                    path="Devmodel1PrinterAlert#critical-event_description"/>
                <DataPointReference id="event_type" path="Devmodel1PrinterAlert#critical-
                    event_type"/>
                <DataPointReference id="timestamp" path="Devmodel1PrinterAlert#critical-
                    timestamp"/>
            </Object>
        </Message>
```

FIG. 7A

```xml
<Transactions>
    <Transaction id="Register" hint="You must first register the Device model1 address before you can discover and enroll devices from it.">
        <Blocks>
            <Block id="1">
                <SendMessage id="RegisterAPI">
                    <UserAssignment path="Settings/ApiIpAddress" defaultValue=""
                        hint="IP address or hostname to connect to."
                        actionArgName="Host Address"/>
                    <UserAssignment path="Settings/ApiKey"
                        actionArgName="Username"/>
                    <UserAssignment path="Settings/ApiSecret"
                        actionArgName="Password"/>
                </SendMessage>
                <Switch>
                    <SwitchOnMessage>
                        <MessageCase>
                            <ReceiveMessage id="Success"/>
                            <BlockAction>
                                <Terminate success="true"/>
                            </BlockAction>
                        </MessageCase>
                        <MessageCase>
                            <ReceiveMessage id="Error">
                                <VariableDefinition id="Resource" path="Resource"/>
                            </ReceiveMessage>
                            <BlockAction>
                                <Terminate success="false">
                                    <Log variableId="Resource"/>
                                </Terminate>
                            </BlockAction>
                        </MessageCase>
                    </SwitchOnMessage>
                </Switch>
            </Block>
        </Blocks>
    </Transaction>
```

FIG. 7B

```xml
<ProtocolDefinition id="50A04BA4-CC15-4085-97FB-06B30B2159A1" name="devic
Devicemodel1-Rest-Printer">
    <Protocol>
        <Transaction id="InitializeProtocol"/>
        <Transaction id="Register"/>
        <Transaction id="Unregister"/>
        <Transaction id="DiscoverDevices"/>
        <Transaction id="SearchNewDevices"/>
        <Transaction id="NewDevices"/>
    </Protocol>
    <Devices>
        <Device id="device-dev-model1-rj2000">
            <ApiTypeId id="device RJ-2050_SR1_CR1"/>
            <ApiTypeId id="device RJ-2140_SR1_CR1"/>
            <ApiTypeId id="device RJ-2150_SR1_CR1"/>
            <Transaction id="CheckIn-rj2000"/>
            <Transaction id="Reboot"/>
            <Transaction id="FactoryReset"/>
            <Transaction id="PrintTestPage"/>
            <Transaction id="Delete"/>
            <Transaction id="InstallUpdatePackageFromUrl"/>
            <Transaction id="InstallUpdatePackageFromFileStore"/>
            <Transaction id="ChangeGeneralSettings"/>
            <Transaction id="ChangeSystemSettings-rj2000"/>
            <Transaction id="ChangeGeneralNetwork"/>
            <Transaction id="ChangeWifi-rj2000_rj3000_td2000"/>
            <Transaction id="ChangeIP4WLan"/>
            <Transaction id="ChangeIP6WLan"/>
            <Transaction id="Critical"/>
            <Transaction id="Error"/>
            <Transaction id="Alert"/>
        </Device>
        <Device id="device-dev-model1-rj2000_jpn">
            <ApiTypeId id="device RJ-2000J"/>
            <Transaction id="CheckIn-rj2000_jpn"/>
            <Transaction id="Reboot"/>
            <Transaction id="FactoryReset"/>
            <Transaction id="PrintTestPage"/>
            <Transaction id="Delete"/>
            <Transaction id="InstallUpdatePackageFromUrl"/>
            <Transaction id="InstallUpdatePackageFromFileStore"/>
            <Transaction id="ChangeGeneralSettings"/>
            <Transaction id="ChangeSystemSettings-rj2000_jpn"/>
            <Transaction id="ChangeGeneralNetwork"/>
            <Transaction id="ChangeWifi-rj2000_rj3000_td2000"/>
            <Transaction id="ChangeIP4WLan"/>
            <Transaction id="ChangeIP6WLan"/>
```

FIG. 7C

```xml
<?xml version="1.0"?>
<RestAPI
 xmlns="http://schemas.datacontract.org/2004/07/Soti.IoT.Protocols.Stacks.Rest.Utilities"
 xmlns:i="http://www.w3.org/2001/XMLSchema-instance">
    <APIVersion>v0.8</APIVersion>
    <ApiType>Server</ApiType>
    <AuthorizationType>Basic</AuthorizationType>
    <Definitions>
        <ReqRespDefinition>
            <DeviceIdPath i:nil="true"/>
            <DeviceTypePath i:nil="true"/>
            <ETLParams
             xmlns:d4p1="http://schemas.microsoft.com/2003/10/Serialization/Arrays">
                <d4p1:KeyValueOfstringstring>
                    <d4p1:Key>Settings.SubscriberId</d4p1:Key>
                    <d4p1:Value>$..subscriber_id</d4p1:Value>
                </d4p1:KeyValueOfstringstring>
            </ETLParams>
            <HeaderParams
             xmlns:d4p1="http://schemas.microsoft.com/2003/10/Serialization/Arrays">
                <d4p1:KeyValueOfstringstring>
                    <d4p1:Key>Authorization</d4p1:Key>
                    <d4p1:Value>Basic $BASE64({Settings.ApiKey}:{Settings.ApiSecret})
                    </d4p1:Value>
                </d4p1:KeyValueOfstringstring>
            </HeaderParams>
            <InputType>Mandatory</InputType>
            <Name>CriticalSubscribe</Name>
            <PayloadContentType>application/json</PayloadContentType>
            <PayloadParams
             xmlns:d4p1="http://schemas.microsoft.com/2003/10/Serialization/Arrays">
                <d4p1:KeyValueOfstringstring>
                    <d4p1:Key>token</d4p1:Key>
                    <d4p1:Value>{ServiceMessageParserDataObject.AccessToken}
                    </d4p1:Value>
                </d4p1:KeyValueOfstringstring>
                <d4p1:KeyValueOfstringstring>
                    <d4p1:Key>url</d4p1:Key>
                    <d4p1:Value>{ServiceMessageParserDataObject.CallbackUrl}
                    </d4p1:Value>
                </d4p1:KeyValueOfstringstring>
            </PayloadParams>
            <PayloadTemplate>{"access_token": "{token}" , "callback_url": "{url}"}
            </PayloadTemplate>
            <RequestProcessing>Regular</RequestProcessing>
            <RequestType>HttpClient</RequestType>
```

FIG. 8

SYSTEMS AND METHODS FOR MANAGING DEVICES USING DYNAMICALLY CONFIGURABLE DEVICE AND PROTOCOLS DEFINITIONS

CROSS-REFERENCE TO RELATED APPLICATIONS

This application is a continuation of U.S. patent application Ser. No. 17/061,900, filed Oct. 2, 2020, which claims all benefit including priority to U.S. Provisional Patent Application No. 62/910,956, filed Oct. 4, 2019. The entire contents of each of the foregoing applications are hereby incorporated by reference herein.

FIELD

This disclosure relates to remote management of devices, and more particularly, to methods, devices, and systems, for management of remote devices using dynamically configurable device and protocol definitions.

BACKGROUND

With the advent of the Internet of Things (IoT), the number of devices within enterprises has expanded greatly. However, there is limited adoption of IoT standards, and the operating systems, communication protocols, and capabilities vary widely from device to device. This presents many challenges for remote management of enterprise devices.

SUMMARY

In accordance with an aspect, there is provided a computer-implemented system for managing a plurality of remote devices of disparate types. The system includes at least one processor; memory in communication with the at least one processor, and software code stored in the memory, which when executed by the at least one processor causes the system to: maintain an electronic device definition repository comprising: a plurality of semantic model definitions for corresponding devices of the plurality of remote devices, each of the semantic model definitions including: a generic portion defining properties and actions of device categories; and a specific portion defining properties and actions of device types; a plurality of data protocol definitions defining protocol messages for communicating with corresponding devices of the plurality of remote devices; receive an action request for an action to be performed by one or more selected devices of the plurality of remote devices; for each one or more selected devices, process the action request including: convert a generic device action and a generic device property to a device-specific action and a device-specific property using the semantic model definition for the selected device; establish one or more messages for communicating the device-specific action request to a given selected device using the data protocol definition for the selected device; and translate the one or more messages of the sequence of messages to an application protocol suitable for communication with the selected device.

In accordance with another aspect, there is provided a computer-implemented method of managing a plurality of remote devices of disparate types. The method includes: maintaining an electronic device definition repository comprising: a plurality of semantic model definitions for corresponding devices of the plurality of remote devices, each of the semantic model definitions including: a generic portion defining properties and actions of device categories; and a specific portion defining properties and actions of device types; a plurality of data protocol definitions defining protocol messages for communicating with corresponding devices of the plurality of remote devices; receiving an action request for an action to be performed by one or more selected devices of the plurality of remote devices; for each one or more selected devices, process the action request including: converting a generic device action and a generic device property to a device-specific action and a device-specific property using the semantic model definition for the selected device; establishing one or more messages for communicating the device-specific action request to a given selected device using the data protocol definition for the selected device; and translating the one or more messages of the sequence of messages to an application protocol suitable for communication with the selected device.

In accordance with a further aspect, there is provided a non-transitory computer-readable medium having stored thereon machine interpretable instructions which, when executed by a processor, cause the processor to perform a computer-implemented method of managing a plurality of remote devices of disparate types. The method includes: maintaining an electronic device definition repository comprising: a plurality of semantic model definitions for corresponding devices of the plurality of remote devices, each of the semantic model definitions including: a generic portion defining properties and actions of device categories; and a specific portion defining properties and actions of device types; a plurality of data protocol definitions defining protocol messages for communicating with corresponding devices of the plurality of remote devices; receiving an action request for an action to be performed by one or more selected devices of the plurality of remote devices; for each one or more selected devices, process the action request including: converting a generic device action and a generic device property to a device-specific action and a device-specific property using the semantic model definition for the selected device; establishing one or more messages for communicating the device-specific action request to a given selected device using the data protocol definition for the selected device; and translating the one or more messages of the sequence of messages to an application protocol suitable for communication with the selected device.

Many further features and combinations thereof concerning embodiments described herein will appear to those skilled in the art following a reading of the instant disclosure.

DESCRIPTION OF THE FIGURES

In the figures,

FIG. 4A, FIG. 4B, and FIG. 4C are each portions of a definition document for a particular device type, in accordance with an embodiment;

FIG. 5 is a portion of a definition document for a particular device category, in accordance with an embodiment;

FIG. 6 is a portion of a definition document for another particular device category, in accordance with an embodiment;

FIG. 7A, FIG. 7B, and FIG. 7C are each portions of a data protocol definition document, in accordance with an embodiment;

FIG. 8 is a portion of a definition document defining a mapping between a data protocol and an application protocol, in accordance with an embodiment;

These drawings depict exemplary embodiments for illustrative purposes, and variations, alternative configurations, alternative components and modifications may be made to these exemplary embodiments.

DETAILED DESCRIPTION

Disclosed herein are systems and methods for remote management of disparate devices. The disparate devices may have disparate characteristics such as, for example, disparate operating systems, communication protocols, and capabilities. Such characteristics may be vendor-specific device-specific, protocol-specific, or the like. Embodiments of the systems and methods disclosed herein may use a data-driven approach that facilitates management of disparate devices and is readily extendible to support additional devices, e.g., new devices that enter the market.

For example, in some embodiments, additional devices can be supported (i.e., to be remotely manageable) without losing access to device-specific features, without the need to recompile system components, and without the need to add new compiled components. Rather, as detailed herein, new devices can be supported by adding new device definition documents, which may, for example be human-readable documents (e.g., in a format such as XML, JSON, or the like). Conveniently, these embodiments allow support for new devices to be implemented in manners that are faster, cheaper, more efficient, more robust, and/or more secure.

Use of such embodiments relieves vendors of the burden of creating new compiled components, or implementing a system-specific API, or developing a protocol converter for each new device they bring to market.

Conveniently, some embodiments of the systems and methods disclosed herein allow end users to control a multitude of disparate devices with issuance of one command (e.g., to change the contrast of all printers in an enterprise). At the same time, the ability to control multiple disparate devices is provided without sacrificing the ability to control functionality that are device-specific (e.g., unique to a subset of the multitude of devices, or perhaps even unique to a single device).

Figure 1:
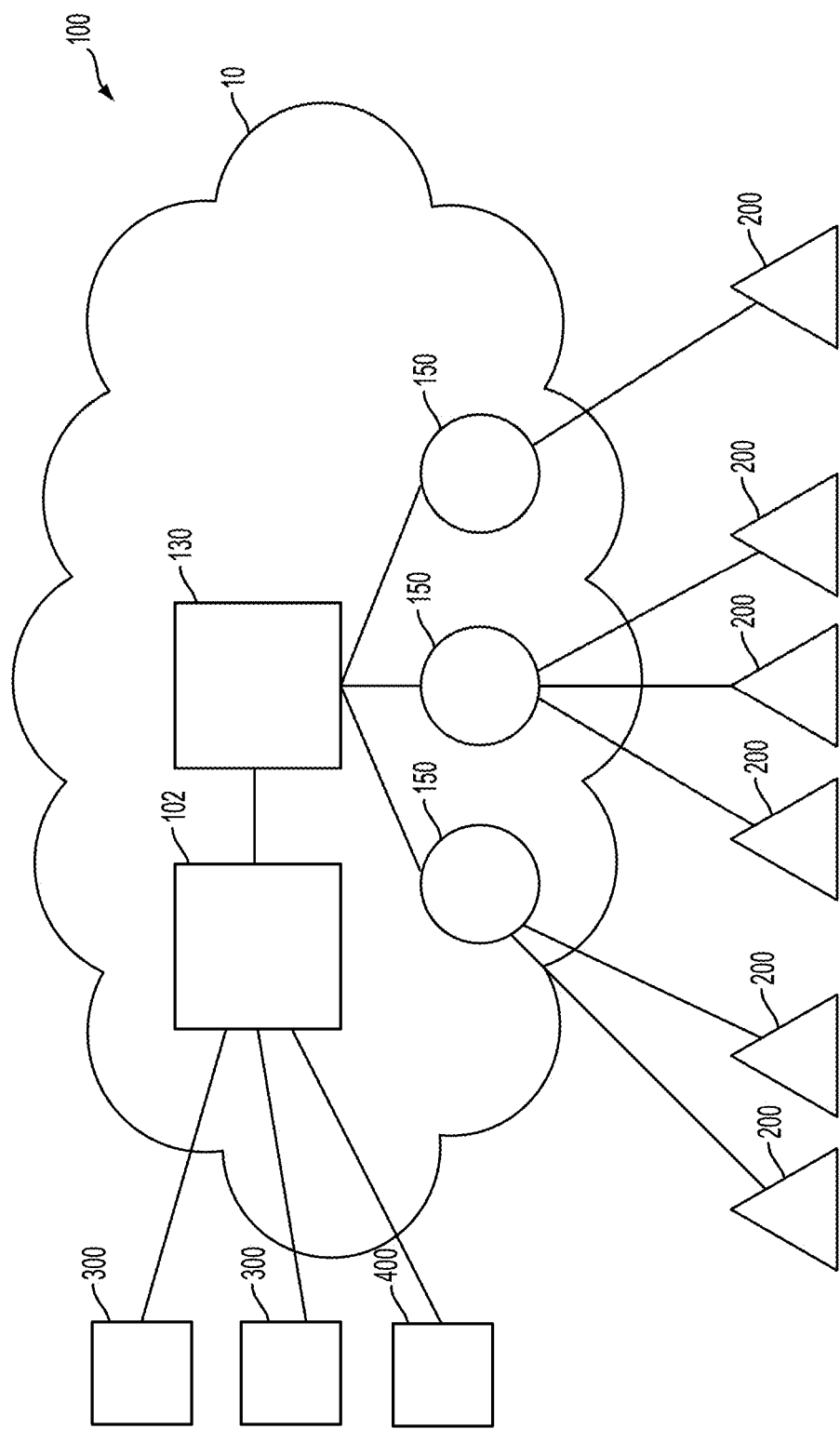
FIG. 1 is a schematic diagram of a device management system in accordance with an embodiment.

FIG. 1 is a schematic diagram of a remote management system 100, in accordance with an embodiment. As illustrated, system 100 includes a management server 102, one or more transaction servers 130, and one or more protocol adapters 150. System 100 is interconnected by way of one or more data communication networks 10 to a plurality of end user devices 300 operable by end users (e.g., enterprise administrators) to manage devices, and a plurality of enterprise devices 200 to be managed. System 100 is also interconnected by way of one or more data communication networks 10 to one or more definition editor devices 400.

Management server 102 is configured to serve data for a user interface, receive user input by way of the user interface, issue actions to be performed at one or more enterprise devices 200, monitor events occurring at one more enterprise devices 200, and perform various other functionality as detailed below.

Transaction server 130 is configured to implement an action issued by management server 102 as a series of back and forth messages with an enterprise device 200, in accordance with a defined data protocol, and perform various other functionality as detailed below.

Protocol adapter 150 is configured to translate messages to a device 200 into the particular application protocol suitable for communication with that device 200, and similarly, translates messages from the device 200 into a device-independent protocol interpretable by a transaction server 130, and perform various other functionality as detailed below. Protocol adapter 150 may communicate directly with a device 200 or may communicate with device 200 by way of a hub or gateway. Such a hub or gateway may be a vendor-specific device that relays messages for devices of that vendor.

Enterprise devices 200 includes a plurality of disparate devices from different vendors. For example, devices 200 may include various types of IoT devices. For example, devices 200 may include printers, lights, appliances, thermostats, various sensors, a network controller, router, or the like. For example, device 200 may include desktop computers, laptop computers, tablet computers, smart phones, or the like.

Each device 200 may have a unique identifier such as a serial number or a MAC address.

End user devices 300 may be any type of device capable of presenting a graphical user interface (e.g., a web interface) of a management server front-end, based on data served by management server 100. For example, end user devices 300 may include desktop computers, laptop computers, tablet computers, smart phones, or the like.

Definition editor devices 400 are each configured to create, edit, or generate device definition files, in manners disclosed herein.

Although devices 200, 300, and 400 are shown to be distinct, in some cases they may be the same device.

Networks 10 may include a packet-switched network, a circuit-switched network, or a combination thereof. Networks 10 may include wired links, wireless links, or a combination thereof. Networks 10 may include wired access points and wireless access points. Networks 10 may include or be connected to the Internet.

Figure 2A:
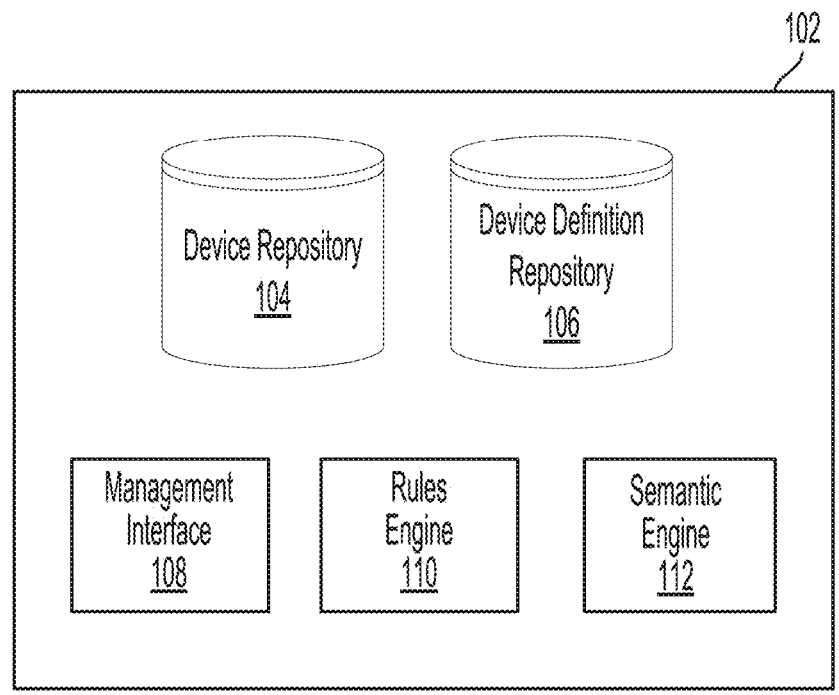
FIG. 2A is a schematic diagram of a management server of the device management system of FIG. 1, in accordance with an embodiment.

FIG. 2A is a schematic diagram of a management server 102, in accordance with an embodiment. As illustrated, management server 102 includes a device repository 104, a device definition repository 106, a management interface 108, a rules engine 110, and a semantic engine 112.

Device repository 104 maintains an electronic datastore including one or more databases. These databases store electronic records of data corresponding to each device 200 under management by system 100. Each record, for example, may include data reflecting a device name, a device description, a device type, a unique device identifier, an identifier or identifiers of the application protocol(s) implemented by the device, and a device profile (e.g., including device properties, actions supported by the device, various metadata about the device, etc.).

Management interface 108 is configured to provide a management server front-end at a device 300, e.g., to allow enterprise administrators to manage devices 200 in their enterprise. So, management interface 108 sends data to a device 300 to instantiate the front-end at the device 300 and receives data from the device 300 corresponding to user input received at the front-end. Such user input may include, for example, actions to be taken at a particular device 200, actions to be taken at a plurality of devices 200, registration of devices 200, deletion of devices 200, checking the status of devices 200, creation of new rules to be implemented by rules engine 110, creation of new definition documents by way of definition tool 402, etc. In an embodiment, management interface 108 implements a service adapting management server 102 to function as an HTTP server for the purpose of exchanging data with end user devices 300.

Rules engine 110 manages the execution of rules that cause actions to be performed at one or more devices 200 when certain triggers occur. Triggers may include, for example, a scheduled event, or a conjunction or disjunction of logical expressions involving property values across one or more devices 200. Actions may include, for example, actions to be taken at a specific device 200, actions to be taken across a pre-defined set of devices 200, actions to be taken across a category of devices, API calls, or alerts. In some embodiment, rules engine 110 may present (e.g., by way of management interface 108) a rules creation wizard that assists an end user in the creation or modification of rules.

Device definition repository 106 maintains an electronic datastore including one or more databases. These databases store a plurality of device definitions documents including one or more semantic models, data protocol definitions, and mappings between a data protocol and an application protocol.

Figure 3:
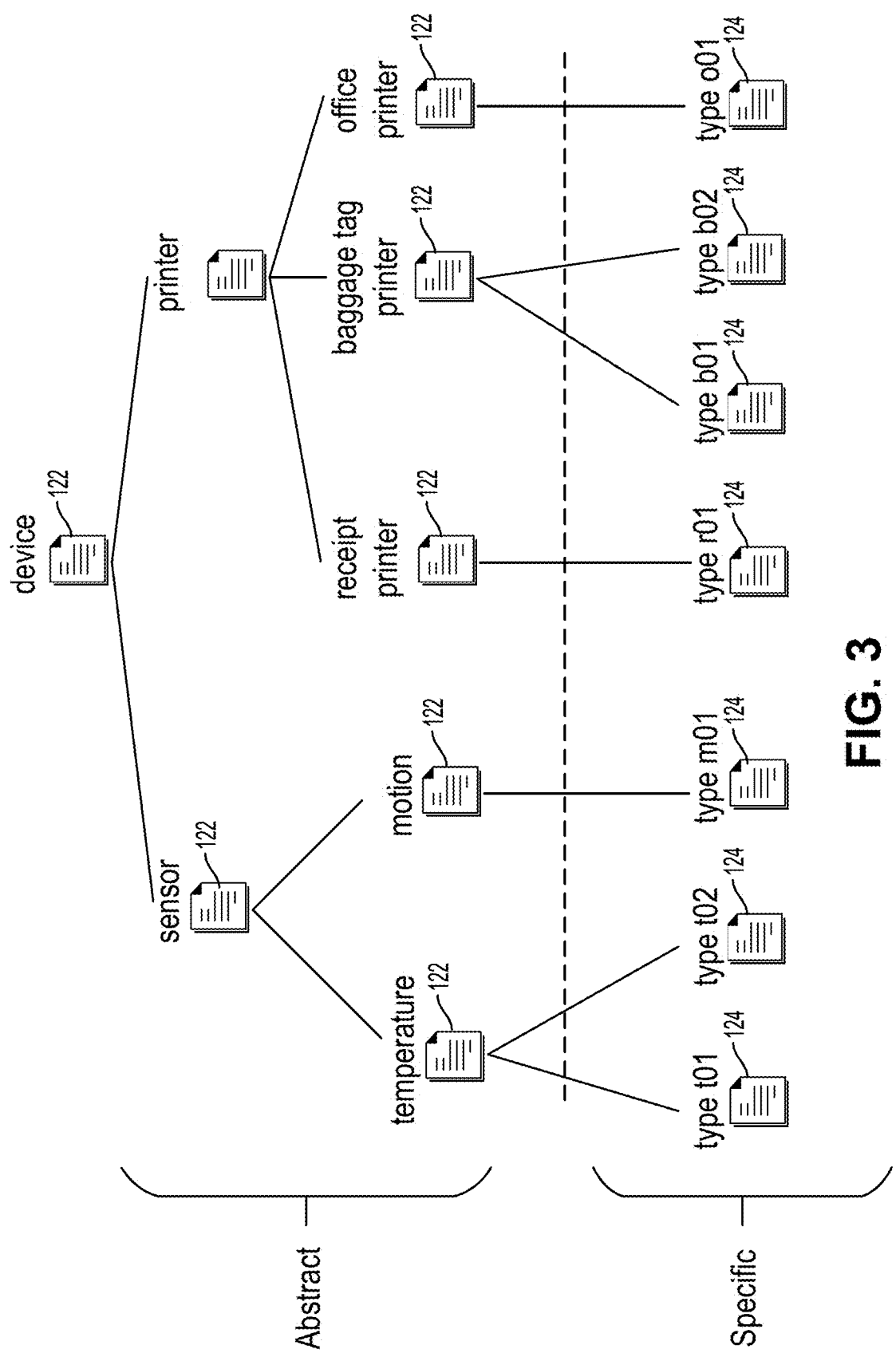
FIG. 3 is a tree diagram of a semantic model implemented by the device management system of FIG. 1, in accordance with an embodiment.

Each semantic model represents a device including, for example, its properties, actions, action inputs and events. A set of device models produces a semantic graph providing a semantic description of the devices, and their hierarchical relationships. An example partial hierarchy of devices is shown in FIG. 3.

Implementation of the semantic model by system 100 allows end users to view and manage any device through a multiple representation layers, e.g., different layers of abstraction: from a specific model representation (providing all the device's unique properties, events, and actions) to increasingly generic representations (hiding device differences and providing properties, events, and actions common, i.e., generic, for a category). This allows end users to use unique device capabilities or to use capabilities common across a device category, as appropriate for the circumstances.

A semantic model includes "device-category" definitions and "device-type" definitions.

A device-type refers to a set of physical devices (i.e., device produced by a vendor) that can be controlled using the same API and communications protocol. For example, if a manufacturer uses the same API to control different printer models, then all the printer models controlled via the same API constitute a device-type.

A device-category is a set of device-types that provide a similar function in an application. For example, different manufacturers have different APIs for controlling printers. In the semantic model, "printer" can be defined as a device-category that contains different printer device-types. In the semantic model, device-categories can encompass device-types or other device-categories. The set of nested device categories originating from one parent category can be referred to as a category tree.

The semantic model includes a plurality of definition documents 124 for device-types and a plurality of definition documents 122 for device-categories (FIG. 3).

Each definition document 124 defines properties and actions of a device-type. A property of a device-type is a variable that can be read from or written to the device via the device's API. An action of a device-type is a command that that can be sent to the device or received from the device to cause some effect. To complete an action, it is often necessary for a sequence of messages to be sent to and received from a physical device via the device's API (provided by the vendor), as implemented by a transaction server 130. Each definition document 124 can also define an event of a device-type. An event of a device-type is a message that can be sent by the device signaling the occurrence of something happening at the device or sensed by the device.

Each definition document 122 defines "common properties" and "common actions" of a device-category. A common property is a property defined at the level of a device-category, which may also be referred to as generic property. A common action is an action defined at the level of a device-category, which may also be referred to as a generic action. Each definition document 122 may also define "common events" of a device-category. A common event is an event defined at the level of a device-category, which may also be referred to as a generic event.

Referring to FIG. 3, each device 200 is represented by combination of a definition document 124 for the device-type of device 200 (which may be referred to as a "specific" portion of semantic model for that device 200) and by one or more definition documents 122 for the device-categories of device 200 that are above the device-type in the device hierarchy (which may be referred to as an "abstract" or "generic" portion of the semantic model for that device 200). For example, as depicted, the semantic model of a baggage tag printer of type b02 includes the definition document 124 for the device-type "b02", the definition document 122 for the device-category "baggage tag printer", the definition document 122 for the device-category "printer", and the definition document 122 for the device-category "device."

In the depicted embodiment, definition documents 122 and 124 of the semantic model, as well as data protocol definition documents and mappings between data protocols to applications protocols are defined in an XML format. Another format may also be used, such as, for example, JSON. In some embodiments, such other format is a human-readable format. In other embodiments, such other format may be in a format readable by a machine only, such as a binary format or the like.

As noted, the database(s) of device definition repository 106 also store data protocol definitions, and mappings between a data protocol and an application protocol.

An application protocol is a communication protocol implemented by a particular device-type, while a data protocol is a device-independent, logical representation of one or more application protocols.

A data protocol definition includes definitions of messages and transactions. Each message describes an API request, response, or event. Each message includes an id and a payload structure. Each property of the payload is linked to a semantic model device property. A transaction describes a flow of messages, transaction error and success conditions, what to extract from the incoming messages and what inputs the first message in the transaction receives. Each transaction is linked to a corresponding action or event in the semantic model.

A mapping between a data protocol and an application protocol is a definition document that contains information about how messages generated in accordance with a data protocol (e.g., by transaction server 130) can be translated to an application protocol understandable by a particular device (or device-type). Similarly, the mapping contains information about how messages generated in accordance with an application protocol (e.g., by a device 200) can be translated to a data protocol understandable by system 100 (e.g., by transaction server 130).

For example, such a mapping may include information regarding:

- a. How to construct a request/publish application protocol message from the information in the corresponding data protocol message and an optional protocol adapter state object (holding information from another requests/responses/events). For example, such data description specifying how to construct a URI/topic, what verb to use (if applicable), how to construct required application protocol message headers and how to construct a message payload for each request/publication using information in a corresponding system message.
- b. How to process a response/event. For example, specifying a response topic (if applicable), what part of the response means success or failure and how to extract data from the application protocol message payload to construct a data protocol message.
- c. How and when to subscribe to the topics/channels to receive events.
- d. How to get authorized to access a specific API. Data from response of such API is stored in the protocol adapter state object and used to construct a proper authorization header in all other application protocol messages
- e. Service messages. i.e., messages that need to be sent before or after processing of the of the application protocol message. (e.g., Webook or PubNub subscriptions.)

In operation, a protocol adapter 150 applies the mapping between a data protocol and an application protocol to convert data protocol messages from transaction server 130 into application protocol messages, e.g., for device requests, responses, events, etc. Similarly, protocol adapter 150 can apply the mappings between a data protocol and an application protocol to convert application protocol messages to data protocol messages.

In one specific embodiment including the HTTP (REST) application protocol, a protocol adapter 150 may use an above-described mapping to handle messages relating to, e.g., obtaining refresh tokens, discovering devices, getting temp, setting temp, etc.

In another specific embodiment including the MQTT application protocol, a protocol adapter 150 may use an above-described mapping to handle messages relating to, e.g., subscribing to a device channel, observe, events, etc.

A data protocol definition may reference a related semantic model definition and a mapping between a data protocol and an application protocol. Together these data definitions can represent a complete representation of the API of a device 200.

Although device repository 104 and device definition repository 106 are shown as separate components in the depicted embodiment, they could also be implemented within a single repository, e.g., with a shared database(s) or a shared database structure.

Semantic engine 112 is configured to parse various semantic model definition documents stored in device definition repository 106. From these model definitions, semantic engine 112 builds a directed acyclic graph that defines the relationships between device models, device-categories, and device-types. Semantic engine 112 also executes conversion scripts for generic properties and actions. Such scripts may include a property converter, which is a script that converts data between generic properties (device-category properties) and specific properties (device-type properties). Such scripts may also include an action converter, which is a script that converts actions between generic actions (device-category actions) and specific actions (device-type actions).

Importantly, converters are used in both specific to generic conversions and generic to specific conversions. In the depicted embodiment, converters are implemented as pluggable scripts and can be updated at runtime.

During operation, when a generic action is manually triggered by a user, or when it is automatically triggered by a rule, this action cannot be sent directly to a transaction server 130. This is because transaction server 130 is configured to recognize specific device-type actions. Therefore, a conversion from the generic action to a specific action must be made. Management server 102 is configured to detect that a triggered action is a generic action that requires conversion. In this case, management server 102 utilizes semantic engine 112 to convert the generic action to a specific action. The specific action is then transmitted to the transaction server 130 for processing. Similarly, management server 102 is configured to utilize semantic engine 112 to convert generic properties to specific properties, including action arguments.

Referring again to FIG. 1, transaction server 130 is an intermediary server between management server 102 and protocol adapters 150. A device action initiated at management server 102 may require multiple messages to be exchanged with a device 200. Operation of transaction server 130 ensures that all the messages required to complete the action are exchanged in the proper order. Transaction server 130 authenticates and registers with management server 102 and can connect to multiple protocol adapters 150, each assigned to translate messages for one or more particular application protocols.

Transaction sever 130 may include a transactional engine that causes execution of device actions based on a data protocol definition. A data protocol definition defines what messages need to be exchanged with protocol adapter to execute a given action. The transactional engine implements control flow (e.g., using a state machine) for a given action based on received message types or the values of certain fields in the received messages.

In one specific embodiment, transaction server 130 is configured to perform one or more of the following functions:

- a. Communicate with management server 102 through secure websockets;
- b. Communicate with protocol adapters 150 through secure websockets;
- c. Keep track of connected protocol adaptors 150;
- d. Parse data protocol definitions to create JSON messages for exchange with protocol adapters 150;
- e. Implement state machines to execute device actions;
- f. Handle different error scenarios of action execution;

g. Embed action assignments (user inputs) into the messages exchanged with protocol adapters 150; and h. Collect assignments from proxy adapter messages to update device state during each action execution.

Protocol adapter 150 is an intermediary server between a transaction server 130 and one or more enterprise devices 200. Each protocol adapter 150 may be configured to translate between a data protocol of messages generated by or intended for a transaction 130 and an application protocol of messages generated by or intended for a device 200. Protocol adapter 150 performs translation using the device-type definitions of the semantic model, data protocol definitions, and a mapping between a data protocol and an application protocol.

In one specific embodiment, protocol adapter 150 is configured to perform one or more of the following functions:

a. Communicate with a transaction server 130 through secure websockets using JSON messages defined in data protocol definitions;

b. Communicate with an enterprise device 200 using a device-specific application protocol;

c. Convert between protocol specific calls/messages and protocol definition JSON messages, back and forth;

d. Implement JSON message dispatching, and depending on the embodiment, queueing;

e. Implement a security protocol, if required for secure communication with an enterprise device 200; and f. Implement device discovery and protocol adapter authorization.

In FIG. 1, management server 102, transaction server 130, and protocol adapters 150 are shown to be separate components. However, in some embodiments, the functionality of management server 102, transaction server 130, and protocol adapters 150 could be implemented at a single server. For example, in such embodiments, a management server 102 may include a transaction service that implements the functionality of transaction server 130 and one or more protocol adapter services that implement the functionality of protocol adapters 150.

Figure 2B:
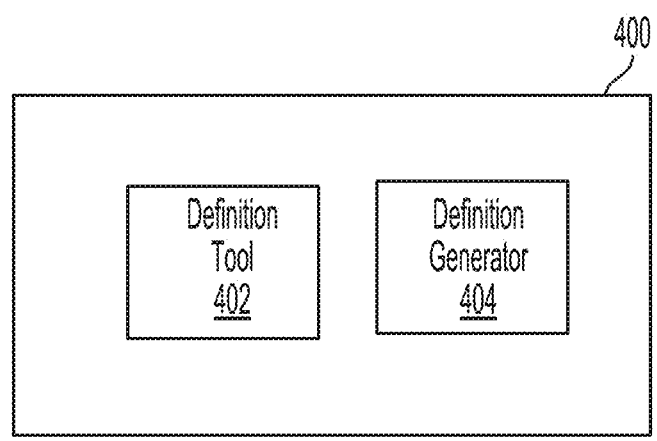
FIG. 2B is a schematic diagram of a definition editor device, in accordance with an embodiment.

FIG. 2B depicts a definition editor device 400, in accordance with an embodiment. Definition editor device 400 includes definition tool 402 and definition generator 404. Definition editor device 400 may present user interfaces to an end user for definition tool 402 and definition generator 404 based on data received from management interface 108. In some embodiments, definition tool 402 and definition generator 404 may be integrated into a single tool or a single set of user interfaces.

Definition tool 402 is a tool that allows the various definition documents described herein to be created and modified (e.g., edited). The definition tool can retrieve definition documents from device definition repository 106, and store new/modified definition documents into device definition repository 106. In one specific embodiment, the definition tool is an integrated development environment (IDE) suitable for editing definition documents, e.g., in XML format, JSON format, or the like. Conveniently, new/modified definition documents can be loaded into device definition repository 106 at run time, allowing system 100 to be reconfigured to support additional devices, new or changed protocols without halting operation.

Definition generator 404 is a tool that automatically generates the various definition documents described herein, or portions thereof. For example, in some embodiments, definition generator 404 can automatically generate (i) semantic model skeletons, (ii) definitions of messages, their ids and structure and simple transactions utilizing them, (iii) mappings between a data protocol and an application protocol. In such embodiments, definition generator 404 may receive inputs reflective of API requests, responses, events, and their payloads.

In one example, for the REST API, definition generator 404 receives data reflecting one or more of the following:

a. Authorization method (No Auth, Basic Auth, API Key, Oauth2);

b. Create separate transaction for all inputs;

c. For each target API call:
  i. Verb and URL (with parameters)
  ii. Payload (JSON or XML) if any
  iii. Success response
  iv. Error response;

d. User-provided tags of messages in the above mentioned set as authorization, discover devices, register, check-in, action or information;

e. User-provided tags of device id and device type properties in a discover device tagged message response payload;

f. User-specified semantic domain and a device category; and g. User-specified parameter of whether to use values in payloads as default for corresponding action inputs assignments.

Using this input, definition generator 404 generates the following definitions:

a. Messages (each message corresponds to one API call) with their ids, payload structure and payload properties links to a corresponding semantic model properties.

b. Transactions, their inputs and action input assignments with references to a corresponding semantic model actions and their inputs.

c. Application protocol mappings, using the same message ids that were used in the messages d. Semantic model modules for a specified device-type and domain based on the properties in the API calls and responses.

Example Definition Documents

FIG. 4A, FIG. 4B, and FIG. 4C each show a portion of a definition document 124 for a particular printer device-type "device-model1-printer", forming part of a semantic model.

As depicted in FIG. 4A, the definition document defines a number of actions and properties (datapoints) for the particular printer device-type. As depicted in FIG. 4B, the definition document defines a number of events for the particular printer device-type. As depicted in FIG. 4C, the definition document defines a number of conversions for the particular printer device-type.

Of note, this definition document 124 includes a reference to definition document 122 for its parent device-category "printer" (FIG. 4A). FIG. 5 shows a portion of this definition document 122 for device-category "printer", which defines further properties, actions, events, conversions, etc. In turn, this definition document 122 for device-category "printer" includes a reference to a definition document 122 for its parent device-category "device" (FIG. 5). FIG. 6 shows a portion of this definition document 122 for device-category "device", which defines yet further properties, actions, events, conversions, etc.

Collectively, the definition document 124 for device-type "device-model1-printer" and the definition document 122 for device-category "printer", and the definition document 122 for device-category "device" define the semantic model for device-type "device-model1-printer". The contents of definition document 124 may be referred to as the "device-specific" or simply "specific" portion of the semantic model. The contents of the two definition documents 122 may be referred to as the "abstract" or "generic" portion of the semantic model.

FIG. 7A, FIG. 7B, and FIG. 7C each show a portion of a data protocol definition document that can be used by a transaction engine 130 and a protocol adapter 150 for communicating with a physical device of device-type "device-model1-printer". In the depicted embodiment, the data protocol definition document includes four parts:

a. FIG. 7A: Messages that can be exchanged between protocol adapter 160 and a device 200.
 b. FIG. 7B: Transactions which are sequences of messages and connecting logic that are exchanged between a transaction engine 130 and a protocol adapter 150 in order to implement the operations defined in the semantic model.
 c. FIG. 7C: One or more devices that are supported within the protocol.

The set of transactions that a device supports define the device-type within the protocol. A single protocol definition can contain definitions for multiple device-types.

d. FIG. 7C: Non-device specific protocol messages. The non-device specific messages include messages that are used to register a device 200 or a hub with a protocol adapter 150 and the messages for device discovery. In cases where the vendor provides an API service (cloud API or a hub), these messages are usually handled by the API service.

Of note and depicted in FIG. 7A, this data protocol definition document includes a reference to a parent definition document, i.e., base-rest-protocol.xml, which may, for example define messages, transactions, etc., for a protocol family. Thus, as in the case of a semantic model, a data protocol definition may also be constructed through a hierarchy of definitions.

FIG. 8 shows a portion of a document defining a mapping between a data protocol and an application protocol that may be used by a protocol adapter 150 for communicating with physical device of device-type "device-model1-printer".

Example Action Conversion

The following example illustrates conversion by an action and parameter (argument) converter described herein, whereby a generic action and associated action parameter is converted to a specific action and associated action parameter.

In this example, there is a device-category printer with a defined property "darkness", which can have a numerical percentage value. Below this device-category there is a device-type of a specific printer that does not have a "darkness" property, but rather has a similar "print_density" property, which can have a numerical range between −5 to 5.

In the semantic model definition for this specific device-type (e.g., "printer-model01"), the property print_density may be defined as follows:

```
<DataPoint id="print_density" name="Print Density" readable="true"
writable="true">
    <DataType name="value">
        <SimpleType type="integer">
            <Constraint>
                <Range min="-5" max="5"/>
            </Constraint>
        </SimpleType>
    </DataType>
</DataPoint>
```

In this semantic model definition for this specific device-type, an action (change-printing_quality) that can be invoked to set the print_density property may be defined as follows:

```
<Action id="change-printing_quality" name="Change Printing Quality">
    <Args>
        <Arg name="Print Speed" datapointReference="
        DevConductorSystemSettings-RJ4200#print_speed"
        optional="true"/>
        <Arg name="Print Density" datapointReference="
        DevConductorPrinterGeneralExtended #print_density"
        optional="true"/>
    </Args>
</Action>
```

In this semantic model definition for this specific device-type, a conversion of the specific property "print_density" to the generic property "darkness" may be defined as follows:

```
<PropertyConversionSpecificToInherited toDeviceDomainId="printers"
toDeviceId="thermal-printer" toDataPointId="PrintQuality#darkness"
function="DevConductorDarknessToPercent">
    <fromDataPointId>DevConductorPrinterGeneralExtended#print_density
    <fromDataPointId>
</PropertyConversionSpecificToInhereted>
```

In this semantic model definition for this specific device-type, a conversion of an action argument from the generic property "darkness" to the specific property "print_density" may be defined as follows:

```
<ActionConversionInheritedToSpecificfromDeviceDomainId="printers"
fromDeviceId="thermal-printer" fromActionId="PrintQuality#change-
print-quality" toActionId="DevConductorSystemSettings-
TD4000_jpn_300DPI#change-printing_quality" >
    <ArgConversion function="PercentToDevConductorDarkness"
        outArgName="Print Density">
            <inputArgName>Darkness</inputArgName>
    </ArgConversion>
</ActionConversionInheritedToSpecific>
```

In the above definition, the function "PercentToDevConductorDarkness" includes a formula converting between generic and specific values.

In the semantic model definition for the device-category "printers", which is incorporated into the semantic model for all printers, the property "darkness" may be defined as follows:

```
<DataPoint id="darkness" name="Darkness" readable="true"
writable="true">
    <DataType name="value" unitOfMeasure="%">
        <SimpleType type="integer">
            <Constraint>
                <Range min="1" max="100"/>
            </Constraint>
        </SimpleType>
    </DataType>
</DataPoint>
```

In this semantic model definition for the device-category "printers", an action "change-print-quality" for setting darkness may be defined as follows:

```
<Action id="change-print-quality" name="Change Print Quality">
  <Args>
    <Arg datapointReference="PrintQuality#darkness"
    name="Darkness" hint="%" optional = "true">
    </Arg>
  </Args>
</Action>
```

During operation of device management system 100, the action "change-print-quality" may be invoked (e.g., by a user of end user device 300) to set the darkness of a physical device of device-type "printer-model01" even though darkness is not a property of this specific device-type. However, one or more converters of semantic model engine 208 automatically convert the generic action of setting "darkness" into a specific action for setting "contrast", and convert the action argument from a generic "darkness" value into a specific "contrast" value.

Conveniently, during operation of device management system 100, the generic action "change-print-quality" may be invoked for many printers of disparate device-types (e.g., via a single user request) and appropriate converters will convert this generic action and its generic argument into appropriate specific actions and specific arguments for each of the printers.

This operation is further described with respect to the example screenshots of FIG. 9A, FIG. 9B, FIG. 9C, and FIG. 9D. These screenshots show portions of the management server front-end interface, which may be presented to end users at one or more of end user devices 300. As noted, data for this interface may be generated at management interface 108, and user inputs made through this interface may be received at management interface 108.

Figure 9A:
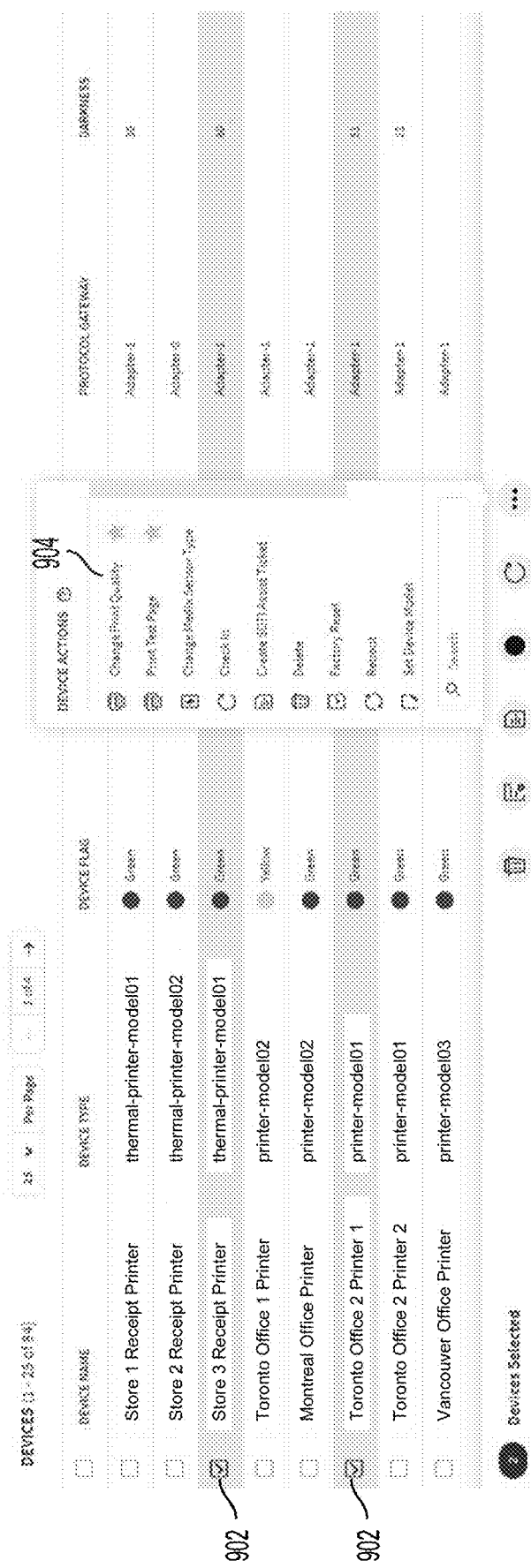
FIG. 9A, FIG. 9B, FIG. 9C, and FIG. 9D are each screenshots of a management interface of the device management system of FIG. 1, in accordance with an embodiment.

Referring to FIG. 9A, the depicted interface 900 shows a multitude of printers (each a physical device 200) of disparate device-types and device-categories that are managed at remote management system 100. As there are disparate device-types, this interface presents a view of generic actions and generic properties for the devices (e.g., a darkness property), as defined in a device-category definition document 122. As depicted, a user has selected two of the devices via selections 902 and with these selections can invoke a number of commands including, for example, a command 904 for invoking a generic action "Change Print Quality".

Figure 9B:
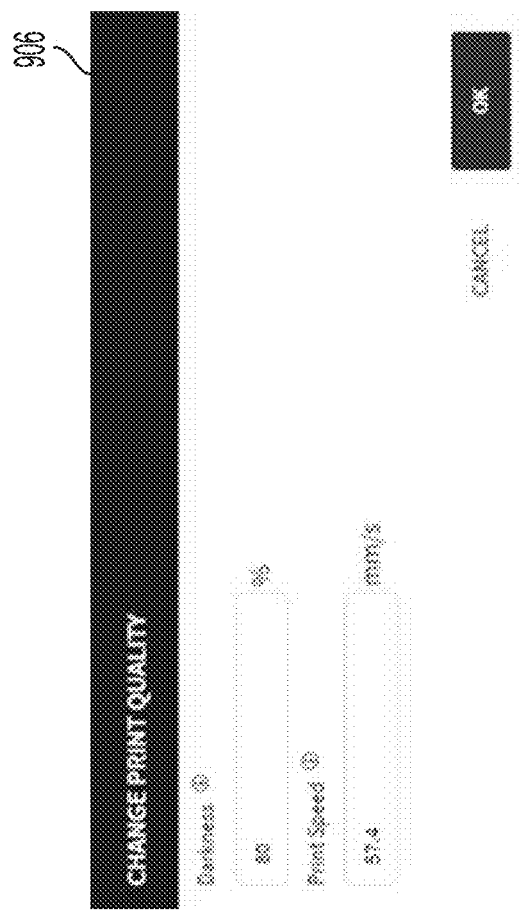

FIG. 9B shows an example screen 906 that is displayed (e.g., by way of a pop-up window) when a user invokes the generic action "Change Print Quality". As depicted, the user is prompted to enter arguments for this generic action, including a darkness argument (expressed as a percentage). Invoking this action initiates an action request, which is then processed into transactions and messages with appropriate generic-to-specific conversions described above. As two printers were selected (FIG. 1), this action causes the darkness property of both printers to be changed. Of course, any number of devices (e.g., hundreds or thousands) could be managed (e.g., to set the darkness property) through the same sequence of user steps.

Figure 9C:
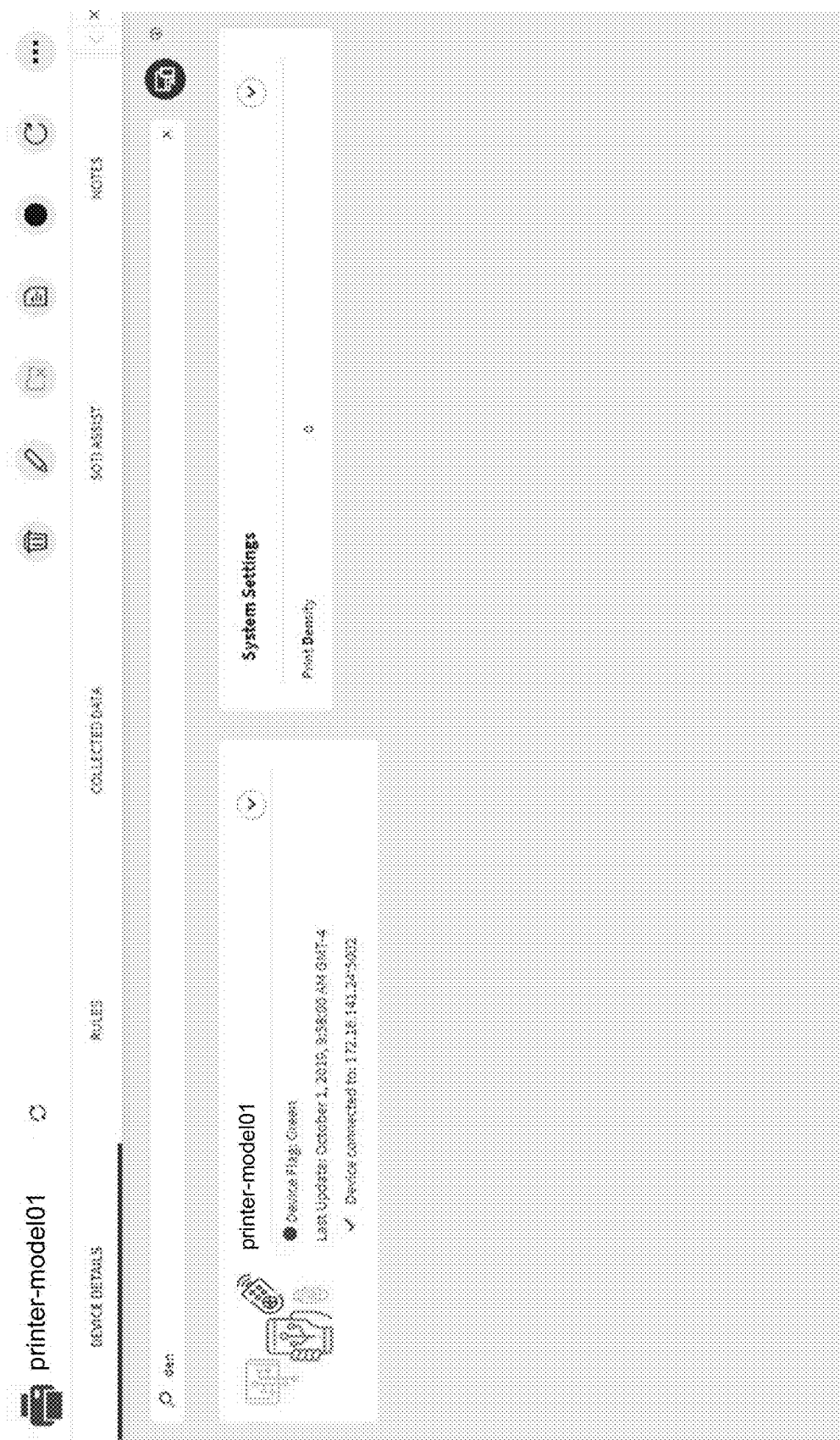
Figure 9D:
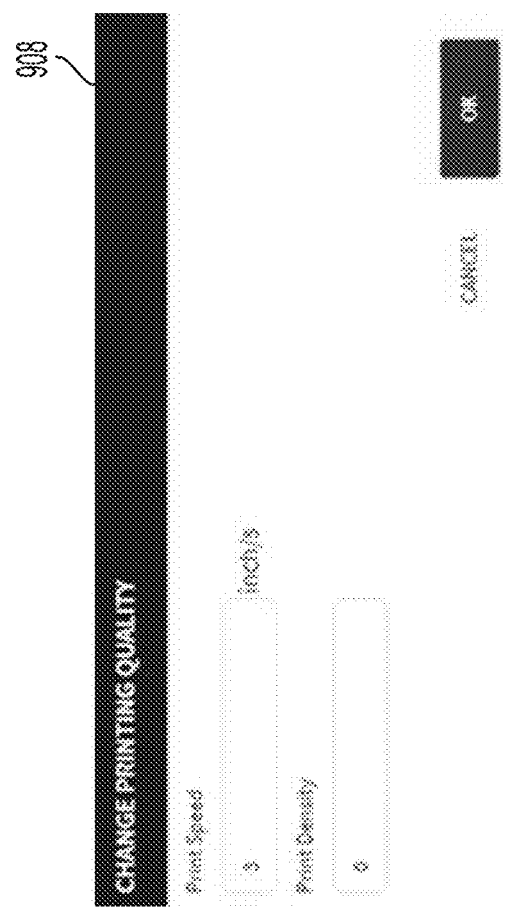

Although the front-end interface allows control of devices of disparate types through generic actions and generic properties, the interface also exposes the specific actions and specific properties of each specific device type, as defined in a device-type definition document 124. For example, FIG. 9C shows that for a specific device-type, i.e., printer-model01, it is possible access the device-specific property "print_density" (as an alternative to setting the generic property "darkness"). FIG. 9D shows an example screen 908 that is displayed when a user invokes the specific action ("Change Printing Quality") for changing the "print_density" property.

As shown, the ability to configure properties or invoke actions specific or unique to particular device types is preserved while providing the ability to control disparate devices through abstracted properties and actions.

Remote Diagnostics

Embodiments of remote management system 100 may be used for remote diagnostic and/or troubleshooting of enterprise devices 200. Remote diagnostics and troubleshooting are especially convenient in the case when an enterprise devices 300 is typically unattended during operation (e.g., which includes many IoT devices such as sensors, or self-service terminals, etc.).

As noted, remote management system 100 allows a user to check properties of enterprise devices 200, including properties relating to operating conditions (e.g., whether the device is online, whether there are any faults, etc.).

Further, remote management system 100 may receive event notifications from an enterprise device 200 indicating an error condition or other warning (e.g., low battery level, low paper supplies). In some cases, remote management system 100 may be configured to retrieve (pull) such information a device 200, e.g., in accordance with a defined schedule. Detection of an error condition or other warning may trigger a notification being sent by system 100 to a technician to be dispatched to the field for repairs. In some cases, remote management system 100 may automatically take troubleshooting steps, such as for example, transmission of a software patch, requesting a restart of device 200, etc.

Figure 10:
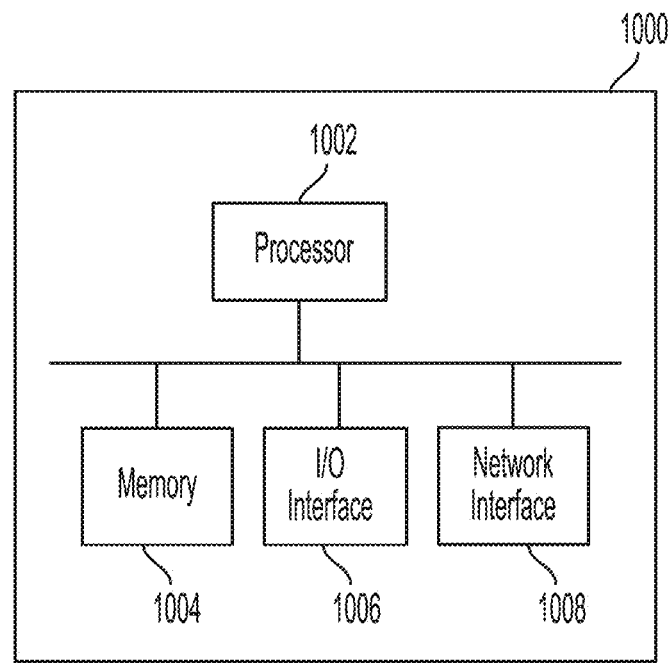
FIG. 10 is a schematic diagram of computing device for implementing the device management system of FIG. 1, in accordance with an embodiment.

FIG. 10 is a schematic diagram of computing device 1000 which may be used to implement one or other of the servers of device management system 100 (e.g., management server 102, transaction server 130, or protocol adapter 150), exemplary of an embodiment. As depicted, computing device 1000 includes at least one processor 1002, memory 1004, at least one I/O interface 1006, and at least one network interface 1008.

Each processor 1002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 1000 is shown but system 100 may include multiple computing devices 1000. The computing devices 1000 may be the same or different types of devices. The computing devices 1000 may be connected in various ways including directly coupled, indirectly coupled via a network, and distributed over a wide geographic area and connected via a network (which may be referred to as "cloud computing").

For example, and without limitation, a computing device 1000 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

Technical Advantages

Embodiments of device management system 100 can provide numerous technical advantages. Of course, as will be appreciated, not all advantages need be provided in each embodiment.

Many conventional device management systems are based on a device management model. In most cases the model is implicit in the system's code. In contrast, the device management model of the depicted embodiment of system 100 is externalized into a set of definition documents. Conveniently, this allows support for new device-types to be readily added to system 100, e.g., by modifying the definition documents.

Importantly, the semantic model and communication protocols for devices are explicitly described in definition documents (e.g., XML documents) instead of being implicitly described in code. This allows new device-types and device-categories to be added to the system without changing underlying code. Conveniently, this also allows end users to define properties, actions and rules that apply to categories of devices that are independent of the physical properties and actions that physical devices provide through their APIs. For example, the IFFT rules engine for IoT devices forces the user to create different rules to accomplish the same if-then scenario for each specific device-type. The depicted embodiment of system 100 allow users to create generic rules that apply to entire device categories.

Conveniently, device-type and device-category information can be dynamically added to and loaded from device repository 104 so that new device categories and types and new device-type actions can be supported by system 100 without taking it out of service.

Further, two different instantiations of device management system 100 can implement different semantic models to manage the same enterprise devices 200. For example, two different instantiations of system 100 could start with the same device-category of smart-light, based on smart-light device-types from different manufacturers. In one instantiation, the smart-light device-category might include current as a generic property, while in the other instantiation the smart-light device-category might include power as a generic property. Because the generic property definitions are created explicitly as definition documents and loaded into system 100 at run time, one change to one document (e.g., an XML document) could result in one system that enables users to execute actions, create rules and collect data about smart-lights based on current and another system that enables users to execute actions, create rules and collect data about smart-lights based on power consumption.

Other Implementation Details

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The foregoing discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A computer-implemented method of managing a plurality of remote devices of specific device types, the method comprising:
   maintaining an electronic device definition repository comprising:
      a plurality of parent definition documents corresponding to categories of the remote devices, each of the parent definition documents including:
         at least one generic property; and
         at least one generic action; and
      a plurality of device-type definition documents corresponding to the specific device types, each of the device-type definition documents including:
         at least one specific property;
         at least one specific action; and
         a reference to at least one of the parent definition documents;
   receiving an action request for at least one of the remote devices of a particular device type;
   detecting that the action request includes the generic action and the generic property; and
   implementing the action request using a semantic model for the particular device type to convert the generic action and the generic property to the specific action and the specific property, the semantic model including at least one of the parent definition documents and at least one of the device-type definition documents.

2. The computer-implemented method of claim 1, further comprising:
   providing a definition tool for a user to edit the parent definition documents and/or the device-type definition documents.

3. The computer-implemented method of claim 2, wherein the definition tool is configured for editing documents in an XML format or a JSON format.

4. The computer-implemented method of claim 2, wherein the definition tool includes an integrated development environment.

5. The computer-implemented method of claim 2, further comprising:
   updating the electronic device definition repository at run time with an output of the definition tool.

6. The computer-implemented method of claim 1, further comprising:
   generating the semantic model for the particular device type using a definition generator.

7. The computer-implemented method of claim 6, where said generating includes generating at least one of the parent definition documents or the device-type definition documents.

8. The computer-implemented method of claim 6, wherein said generating includes generating a semantic model skeleton.

9. The computer-implemented method of claim 1, wherein the electronic device definition repository further includes a plurality of data protocol definitions, each defining messages and transactions of a data protocol for communicating with the remote devices.

10. The computer-implemented method of claim 9, wherein said implementing the action request includes using at least one of the data protocol definitions to generate at least one message for communicating the specific action and the specific property to the at least one of the remote devices.

11. The computer-implemented method of claim 9, further comprising:
   generating at least one of the data protocol definitions using a definition generator.

12. The computer-implemented method of claim 11, wherein said generating includes generating definitions of a message structure, a message identifier, a message payloads, and/or a correspondence to a defined property of the semantic model.

13. The computer-implemented method of claim 11, wherein said generating includes generating definitions of a transaction input, a transaction action, and/or a correspondence to a defined action of the semantic model.

14. The computer-implemented method of claim 11, wherein the definition generator receives inputs reflective of an API request, an API response, an API event, and/or an API payload.

15. The computer-implemented method of claim 1, wherein the electronic device definition repository further includes a plurality of protocol mapping definitions, each defining a mapping between a data protocol and an application protocol.

16. The computer-implemented method of claim 15, wherein said implementing the action request includes using at least one of the protocol mapping definitions to translate one or more messages to an application protocol suitable for communication with the at least one of the remote devices.

17. The computer-implemented method of claim 16, further comprising:
   transmitting the translated one or more messages to the at least one of the remote devices.

18. The computer-implemented method of claim 15, further comprising:
   generating at least one of the protocol mapping definitions using a definition generator.

19. A computer-implemented system for managing a plurality of remote devices of specific device types, the system comprising:
   at least one processor;
   memory in communication with the at least one processor, and software code stored in the memory, which when executed by the at least one processor causes the system to:

maintain an electronic device definition repository comprising:
- a plurality of parent definition documents corresponding to categories of the remote devices, each of the parent definition documents including:
  - at least one generic property; and
  - at least one generic action; and
- a plurality of device-type definition documents corresponding to the specific device types, each of the device-type definition documents including:
  - at least one specific property;
  - at least one specific action; and
  - a reference to at least one of the parent definition documents;

receive an action request for at least one of the remote devices of a particular device type:

detect that the action request includes the generic action and the generic property; and implement the action request using a semantic model for the particular device type to convert the generic action and the generic property to the specific action and the specific property, the semantic model including at least one of the parent definition documents and at least one of the device-type definition documents.

20. A non-transitory computer-readable medium having stored thereon machine interpretable instructions which, when executed by a processor, cause the processor to perform a computer-implemented method of managing a plurality of remote devices of specific device types, the method comprising:

maintaining an electronic device definition repository comprising:
- a plurality of parent definition documents corresponding to categories of the remote devices, each of the parent definition documents including:
  - at least one generic property; and
  - at least one generic action; and
- a plurality of device-type definition documents corresponding to the specific device types, each of the device-type definition documents including:
  - at least one specific property;
  - at least one specific action; and
  - a reference to at least one of the parent definition documents;

receiving an action request for at least one of the remote devices of a particular device type:

detecting that the action request includes the generic action and the generic property; and implementing the action request using a semantic model for the particular device type to convert the generic action and the generic property to the specific action and the specific property, the semantic model including at least one of the parent definition documents and at least one of the device-type definition documents.

\* \* \* \* \*